United States Patent Office 3,114,778
Patented Dec. 17, 1963

3,114,778
FLUORINATED VINYL ETHERS AND THEIR
PREPARATION
Charles Gerhard Fritz, Earl Phillip Moore, Jr., and
Stanley Selman, Wilmington, Del., assignors to E. I.
du Pont de Nemours and Company, Wilmington, Del.,
a corporation of Delaware
No Drawing. Filed Jan. 3, 1961, Ser. No. 79,961
20 Claims. (Cl. 260—614)

The present invention relates to the preparation of fluorinated ethers, and, more particularly, to the preparation of perfluorinated vinyl ethers.

Partially fluorinated vinyl ethers have been made heretofore by a reaction involving an alkali metal alkoxide and a fluorinated ethylene. For example, trifluorovinyl ethers are prepared by the following reaction

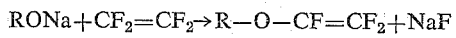
$$RONa + CF_2=CF_2 \rightarrow R-O-CF=CF_2 + NaF$$

All of the known reactions for the preparation of halogenated vinyl ethers involve the use of an alcohol. The preparation of a completely fluorinated vinyl ether by these prior art methods would, therefore, require a completely fluorinated alcohol. It has, however, been established and is well known (see, for example, p. 137 of the ACS Monograph, "Aliphatic Fluorine Compounds," by Lovelace et al., published 1958) that completely fluorinated primary alcohols are inherently unstable and can not be isolated. Hence, it is apparent that the prior art techniques for the preparation of trifluorovinyl ethers are not suitable for the preparation of perfluorinated vinyl ethers and vinyl ethers wherein the ether oxygen is attached to a $CF_2$ group.

It is, therefore, the principal object of the present invention to provide a process for the preparation of perfluorinated vinyl ethers and vinyl ethers wherein the ether oxygen is attached to a $CF_2$ group. It is another object to provide a method for the preparation of novel ethers that can not be prepared by other techniques. Other objects will become apparent hereinafter.

In accordance with the present invention, perfluorinated vinyl ethers are produced by a process which comprises reacting a fluorinated acid fluoride with hexafluoropropylene epoxide in the presence of a catalyst comprising activated carbon or a fluoride of an alkali metal, silver or a quaternary ammonium radical, the fluoride catalyst being employed in combination with a strongly polar solvent inert to the reagents such as polyalkyl ethers and hydrocarbon nitriles, thereafter pyrolyzing the resulting etherified acid product in the form of the acid fluoride, or the monovalent metal salt of the acid, and recovering the resulting vinyl ether. The term "acid" as employed herein is intended to include mono- as well as dicarboxylic acids.

The hexafluoropropylene epoxide employed as a reagent in the process of the present invention is prepared by the oxidation of hexafluoropropylene using alkaline aqueous hydrogen peroxide.

The acid fluorides employed in the process of the present invention may vary widely in their structure. Thus, suitable alkanoic acid fluorides include carbonyl fluoride, perfluoroacetyl fluoride, perfluoropropionyl fluoride, perfluorobutyryl fluoride, perfluorododecanoyl fluoride, perfluoroisobutyryl fluoride and similar perfluoroalkanoyl fluorides. It is also possible to employ dicarboxylic acid fluorides, which by the process of the present invention lead to novel perfluorinated divinyl ethers with two ether linkages in the molecule. Examples of such alkandioic acid fluorides are the diacid fluorides of perfluorooxalic acid, -malonic acid, -succinic acid, -glutaric acid, -adipic acid, -pimelic acid, -suberic acid, -azelaic acid, and -sebacic acid. The acid fluoride employed, furthermore, need not necessarily be a fluorocarbon acid fluoride, thus, omega-hydroperfluoroalkyl acid fluorides, i.e., compounds having the general structure $HC_nF_{2n}COF$, wherein $n$ indicates the number of carbon atoms in the radical attached to the acid fluoride group, are suitably employed in the process of the present invention.

The reaction of the hexafluoropropylene epoxide with acid fluoride is carried out in bulk using active carbon as the catalyst, or by reaction in a polar solvent using a fluoride catalyst. The solvents suitable in the preparation of the perfluoropropionyl fluorides formed as intermediates in the process are nitriles and polyalkyl ethers liquid at reaction conditions. Examples of these solvents are the dimethyl ether of ethylene glycol, the dimethyl ether of diethylene glycol, benzonitrile, acetonitrile, etc. Other highly polar solvents which have no active hydrogen are also useful in the process. These solvents include dimethyl sulfoxide and N-methyl pyrrolidone. The catalysts suitable in the reaction are the alkali metal fluorides, quaternary ammonium fluorides and silver fluoride. The fluorides may be used as such or admixed with other alkali metal halides. Such mixtures are, for example, mixtures of LiCl—CsF, LiCl—KF and LiBr—KF. Catalyst concentration is not critical and amounts of catalyst are determined by the environment in which the reaction is carried out. In general, the concentration of the catalyst is at least 0.01% by weight of the hexafluoropropylene epoxide. Reaction temperatures may be greatly varied from −80 to 200° C., although a preferred temperature range is from −30 to 100° C. Pressures ranging from below atmospheric pressure to several hundred atmospheres have been employed and it has been established that pressure is not a critical factor in the process described. Pressure is primarily employed for convenience depending on the physical properties of the reactants. The catalyst may be either in solution or present as a second solid phase.

The first reaction step above described may be illustrated by the following equation

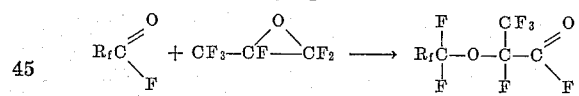

where $R_f$ represents, for example, a perfluoroalkyl radical.

The resulting etherified acid fluoride is then pyrolyzed to the vinyl ether. The pyrolysis may be carried out with the acid fluoride directly or the acid fluoride can be converted into a monovalent metal salt such as the alkali metal salt of the acid and then pyrolyzed to the ether. The hydrolysis is carried out by contacting the acid fluoride with water. The formation of the alkali metal salt, for example, is accomplished by carrying out the hydrolysis in the presence of alkali metal base, such as KOH. The acid fluoride is generally pyrolyzed in gaseous form by passage through a reaction zone maintained at temperatures of 300 to 600° C. In the presence of a catalyst, such as sodium sulfate, the pyrolysis may be carried out at somewhat lower temperatures. The pyrolysis of the alkali metal salt is carried out at temperatures of 170 to 250° C. In the presence of the polar solvents described above, the pyrolysis may be carried out at temperatures as low as 100° C.

The process of the present invention is further illustrated by the following examples.

*Example I*

A dry 30 ml. stainless steel cylinder was charged with 1 g. of previously dried (heated 20 hrs. at 400° C. in vacuo) "Darco," commercially available activated carbon, and was cooled to −180° C. and evacuated. There was then introduced 8.7 g. of hexafluoropropylene epoxide and 8.7 g. of pentafluoropropionyl fluoride. The mixture was slowly warmed to room temperature and kept at room temperature for 2 days. On work-up, there was obtained 7.8 g. of perfluoro-2-propoxypropionyl fluoride having a boiling point of 55 to 57° C. Both epoxide and perfluoropropionyl fluoride were recovered in nearly equal amounts indicating that the product was formed by interaction of acid fluoride and epoxide.

The perfluoro-2-propoxy propionyl fluoride is dehalocarbonylated by passage through a bed of dry potassium sulfate pellets at 300° C. with a contact time of 10 minutes. The major product isolated is perfluoropropyl perfluorovinyl ether, boiling point 35–36° C.

*Example II*

Perfluoro-2-propoxypropionyl fluoride, prepared in accordance with the procedure set forth in Example I was charged into a polyethylene bottle equipped with a Dry Ice condenser. There was then added 15 weight percent, based on the weight of the acid fluoride, of water. The reaction mixture was neutralized to phenolphthalein end point with 10 N KOH in water and was evaporated to dryness at 35° C. The dry mixture of potassium perfluoro-2-propoxypropionate and potassium fluoride was further dried in vacuo at 100° C. The resulting mixture was placed in a glass reaction vessel equipped with a Dry Ice trap. The vessel was heated to 185 to 215° C. for a period of 24 hours. A 79% yield of perfluoropropyl perfluorovinyl ether was obtained on distillation of the product in the trap.

*Example III*

Perfluoro-2-methoxypropionyl fluoride was prepared by the reaction hexafluoropropylene epoxide with carbonyl fluoride in the presence of "Darco" activated carbon. A 33% conversion to perfluoro-2-methoxypropionyl fluoride having a boiling point of 10 to 12° C. was obtained. The nuclear magnetic resonance and infrared spectra were consistent with the assigned structure. The resulting product was dehalocarbonylated by passage through a bed of dry potassium sulfate pellets at 300° C. with a contact time of 10 minutes. A 60% yield of perfluoromethyl perfluorovinyl ether having a boiling point of −22° C. was obtained. Infrared and nuclear magnetic reasonance spectra were consistent with the assigned structure.

A similar result is obtained when the perfluoro-2-methoxypropionyl fluoride is converted to a monovalent metal salt of the acid and then pyrolyzed.

*Example IV*

Into a stainless steel autoclave there was charged 30 g. of cesium fluoride and 75 ml. of diethylene glycol dimethyl ether. The vessel was cooled to −80° C., evacuated and charged with 66 g. of carbonyl fluoride and 83 g. of hexafluoropropylene epoxide. The vessel was closed and heated to 75° C. for 4 hrs. Low temperature distillation afforded 3 g. of hexafluoropropylene epoxide and 82 g. of perfluoro-2-methoxypropionyl fluoride, B.P. 10 to 12° C. Into a reaction vessel consisting of a polyethylene bottle with a Dry Ice trap was charged 201 g. of the product of the preceding step. There was then added 30 g. of water. The reaction mixture was neutralized to phenol phthalein end point with 10 N KOH in water and was then evaporated to dryness at 35° C. The dry mixture of potassium perfluoro-2-methoxypropionate and potassium fluoride was further dried in vacuo at 100° C. and then charged to a glass reaction vessel attached to a trap cooled by Dry Ice. It was then heated to 185 to 215° C. for a period of 24 hours. Distillation of the condensate in the trap afforded 115 g. of perfluoromethyl perfluorovinyl ether. Substantially the same result is obtained when benzonitrile is employed in the foregoing procedure instead of diethylene glycol dimethyl ether.

*Example V*

Into a platinum tube 6″ x 0.5″ sealed at one end, was charged 0.55 g. of "Darco" activated carbon. The tube was evacuated, heated to 600° C., cooled and charged with 3.4 g. of perfluoroacetyl fluoride and 3.4 g. of hexafluoropropylene epoxide. After sealing, the reaction mixture was maintained at −15° C. for 48 hours. On opening, there was obtained an 89% yield, based on hexafluoropropylene epoxide, of perfluoroethoxypropionyl fluoride, B.P., 30 to 33° C. The nuclear magnetic resonance and infrared spectra of the product were consistent with the assigned structure. The resulting perfluoroethoxypropionyl fluoride is pyrolyzed to the perfluoroethyl perfluorovinyl ether by pyrolysis at a temperature of 300° C. over sodium sulfate.

*Example VI*

Into a 320 ml. stainless steel reaction vessel was charged 11.6 g. of cesium fluoride and 20 ml. of diethylene glycol dimethyl ether. The vessel was cooled to −80° C. and evacuated. There was then added 60 g. of perfluoroisobutyryl fluoride and 43 g. of hexafluoropropylene epoxide. The bomb was heated to 100° C. for 4 hours. Distillation of the liquid product afforded 10 g. of perfluoro-2-isobutoxypropionyl fluoride, boiling point 76 to 78° C. An infrared spectrum of the product was consistent with the assigned structure. A substantially similar result is obtained when the cesium fluoride is replaced with silver fluoride or tetramethyl ammonium fluoride.

The perfluoro-2-isobutoxypropionyl fluoride is converted to perfluoroisobutyl perfluorovinyl ether in accordance with the procedure of Example I.

*Example VII*

Into a 30 ml. stainless steel cylinder were charged 1 g. of "Darco" activated carbon, 18 g. of hexafluoropropylene epoxide and 4.3 g. of oxalyl fluoride. The cylinder was allowed to stand at room temperature for 22 hours. Distillation of the product gave 2.4 g. of perfluoro-2,7-dimethyl-3,6-dioxaoctanedioyl fluoride, B.P. 98 to 100° C. An infrared spectrum of the product was consistent with the formula. The product was converted to the corresponding potassium salt and on pyrolysis resulted in perfluoroethylenebis(perfluorovinyl ether).

*Example VIII*

Into a glass reaction vessel was placed 9 g. of cesium fluoride, 90 ml. of diethylene glycol dimethyl ether and 73 g. of perfluoroglutaryl fluoride. The reaction was cooled in ice and stirred rapidly. There was then added 120 g. of hexafluoropropylene epoxide at such a rate that the pressure in the flask did not exceed 5 p.s.i.g. Work-up of the reaction mixture afforded perfluoro-2,10-dimethyl-3,9-dioxaundecanedioyl fluoride, B.P. 156 to 158° C., in 80% yield based on perfluoroglutaryl fluoride. The nuclear magnetic resonance and infrared spectra of the product were consistent with the assigned structure. Similar results are obtained when potassium fluoride or a mixture of potassium fluoride and lithium bromide is employed.

The dicesium salt of perfluoro-2,10-dimethyl-3,9-dioxaundecanedioic acid was prepared from cesium carbonate using the procedure outlined in Example VI. Into a gas reaction vessel attached to a trap cooled by Dry Ice was placed 105 g. of dicesium salt of the acid. The system was evacuated and the reaction vessel was heated to 180° C. for 3 hours. Distillation of the condensate afforded 21 g. of perfluoropentamethylenebis(perfluorovinyl ether), B.P., 129 to 133° C. Substantially the same result was obtained when the thallium salt was prepared from the dicarboxylic acid and thallium carbonate.

Example IX

Example VIII was repeated except that the dipotassium salt of perfluoro-2,10-dimethyl-3,9-undecanedioic acid was formed from the acid fluoride and potassium hydroxide. In a glass vessel equipped with stirrer, nitrogen inlet and an outlet leading to a glass receiver were placed 200 ml. of benzonitrile, 20 ml. of benzene and 126 g. of the dipotassium salt of perfluoro-2,10-dimethyl-3,9-dioxaundecanedioic acid. The reaction mixture was heated to 130 to 150° C. for 5 hours. Distillation of the condensate afforded 36.5 g. of perfluoropentamethylenebis(perfluorovinyl ether).

The process of the present invention has been demonstrated by the foregoing examples, which, however, are not intended to limit the scope of the invention thereto. The process described is particularly useful for the preparation of perfluorinated vinyl ethers, which are novel compositions. The vinyl ethers of the present invention are reactive intermediates of outstanding utility. Thus, the vinyl ethers can be homopolymerized and copolymerized with other ethylenically unsaturated compounds. Particularly useful high molecular weight polymers are obtained by the copolymerization of the vinyl ethers with tetrafluoroethylene. The homopolymerization or copolymerization is carried out in accordance with procedures such as described in U.S. 2,952,669, issued to M. I. Bro on September 13, 1960, employing perfluorinated solvents and initiators. The divinyl ethers are of particular importance in obtaining cross-linkable perfluorocarbon resins. Perfluorinated divinyl ethers that are outstanding in this application are ethers which have the general formula

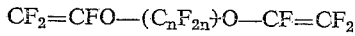

where $n$ is a number from 2 to 20 and represents the number of carbon atoms in the perfluorinated alkylene radical linking the perfluorovinyl ether groups.

We claim:

1. A process for the preparation of fluorinated vinyl ethers which comprises reacting a fluorinated acid fluoride, selected from the class consisting of fluorinated alkanoic acid fluorides and fluorinated alkanedioic acid difluorides with hexafluoropropylene epoxide in the presence of a catalyst selected from the class consisting of activated carbon, alkali metal fluorides, silver fluoride and quaternary ammonium fluorides, said fluoride catalysts being employed in combination with an inert polar solvent selected from the class consisting of polyalkyl ethers and hydrocarbon nitriles, thereafter pyrolyzing at a temperature of 100 to 600° C. the resulting etherified acid product in the form selected from the group consisting of the acid fluoride, and the monovalent metal salt of the acid, and recovering the resulting vinyl ether.

2. A process for the preparation of perfluorinated vinyl ethers which comprises reacting a fluorinated alkanoic acid fluoride with hexafluoropropylene epoxide in the presence of a catalyst selected from the class consisting of activated carbon, alkali metal fluorides, silver fluoride and quaternary ammonium fluorides, said fluoride catalysts being employing in combination with an inert polar solvent selected from the class consisting of polyalkyl ethers and hydrocarbon nitriles, thereafter pyrolyzing at a temperature of 100 to 600° C. the resulting etherified acid product in the form selected from the group consisting of the acid fluoride, and the monovalent metal salt of the acid, and recovering the resulting perfluorinated vinyl ether.

3. A process for the preparation of perfluorinated vinyl ethers which comprises reacting a fluorinated acid fluoride, selected from the class consisting of fluorinated alkanoic acid fluorides and fluorinated alkanedioic acid difluorides with hexafluoropropylene epoxide in the presence of activated carbon, thereafter pyrolyzing at a temperature of 100 to 600° C. the resulting etherified acid product in the form selected from the group consisting of the acid fluoride, and the monovalent metal salt of the acid, and recovering a perfluorinated vinyl ether.

4. A process for the preparation of perfluorinated vinyl ethers as set forth in claim 3 wherein the acid product is pyrolyzed in the form of the acid fluoride at a temperature of 200 to 600° C.

5. A process as set forth in claim 4 wherein the pyrolysis is carried out over potassium sulfate pellets.

6. A process for the preparation of perfluorinated vinyl ethers as set forth in claim 3 wherein the acid product is pyrolyzed in the form of the monovalent metal salt at a temperature of 110° to 250° C.

7. A process for the preparation of perfluorinated vinyl ethers which comprises reacting a fluorinated acid fluoride, selected from the class consisting of fluorinated alkanoic acid fluorides and fluorinated alkanedioic acid difluorides with hexafluoropropylene epoxide in the presence of an alkali metal fluoride in combination with an inert polar solvent selected from the class consisting of polyalkyl ethers and hydrocarbon nitriles, thereafter pyrolyzing at a temperature of 100° C. to 600° C. the resulting etherified acid product in the form of the acid fluoride, or the monovalent metal salt of the acid, and recovering the resulting perfluorinated vinyl ether.

8. A process for the preparation of perfluorinated vinyl ethers as set forth in claim 7 wherein the alkali metal fluoride is combined with a polyalkyl ether.

9. A process as set forth in claim 8 wherein the polyalkyl ether is ethylene glycol dimethyl ether.

10. A process as set forth in claim 8 wherein the polyalkyl ether is diethylene glycol dimethyl ether.

11. A process for the preparation of perfluorinated vinyl ethers as set forth in claim 7 wherein the etherified acid product is pyrolyzed in the form of the acid fluoride at a temperature of 200 to 600° C.

12. A process for the preparation of perfluorinated vinyl ethers as set forth in claim 7 wherein the etherified acid product is pyrolyzed in the form of the alkali metal salt at a temperature of 100° to 250° C.

13. The process as set forth in claim 2 wherein the acid fluoride is carbonyl fluoride.

14. The process as set forth in claim 2 wherein the acid fluoride is perfluoropropionyl fluoride.

15. The process as set forth in claim 2 wherein the acid fluoride is perfluoroacetyl fluoride.

16. The process as set forth in claim 1 wherein the acid fluoride is oxalyl fluoride.

17. The process as set forth in claim 1 wherein the acid fluoride is perfluoroglutaryl fluoride.

18. A perfluorinated divinyl ether having the general formula

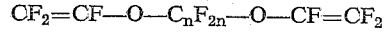

wherein $n$ is a number from 2 to 20.

19. Perfluoroethylenebis(perfluorovinyl ether).

20. Perfluoropentamethylenebis(perfluorovinyl ether).

No references cited.

UNITED STATES PATENT OFFICE
CERTIFICATE OF CORRECTION

Patent No. 3,114,778

December 17, 1963

Charles Gerhard Fritz et al.

It is hereby certified that error appears in the above numbered patent requiring correction and that the said Letters Patent should read as corrected below.

Column 5, line 60, for "employing" read -- employed --; column 6, line 20, for "110°" read -- 100° --.

Signed and sealed this 26th day of May 1964.

(SEAL)
Attest:

ERNEST W. SWIDER
Attesting Officer

EDWARD J. BRENNER
Commissioner of Patents